United States Patent
Garvin et al.

[11] Patent Number: 6,086,817
[45] Date of Patent: Jul. 11, 2000

[54] OFF-GAS HOOD FOR A BASIC OXYGEN FURNACE AND METHOD OF REPAIR

[75] Inventors: Hawley F. Garvin, Cockeysville, Md.; William S. Hutchinson, III, Newark, Del.; Michael S. Vogler, Phoenix, Md.

[73] Assignee: Bethlehem Steel Corporation

[21] Appl. No.: 09/174,528

[22] Filed: Oct. 16, 1998

[51] Int. Cl.$^7$ .................................................. C21B 7/22
[52] U.S. Cl. .......................................... 266/158; 266/241
[58] Field of Search ................................. 266/158, 241, 266/135, 44

[56] References Cited

U.S. PATENT DOCUMENTS

| | | |
|---|---|---|
| 3,168,073 | 2/1965 | Durham et al. . |
| 3,197,186 | 7/1965 | Mirigay ..................................... 266/158 |
| 3,323,495 | 6/1967 | Blaskowiski . |
| 3,347,539 | 10/1967 | Mitchell et al. ........................ 266/158 |
| 3,372,917 | 3/1968 | Richardson .............................. 266/158 |
| 3,380,728 | 4/1968 | Baillie ..................................... 266/158 |
| 3,445,101 | 5/1969 | Reighart ................................. 266/158 |
| 3,482,827 | 12/1969 | Maide ..................................... 266/158 |
| 3,593,974 | 7/1971 | Reid ........................................ 266/158 |
| 3,661,372 | 5/1972 | Mitchell et al. ........................ 266/158 |
| 3,854,708 | 12/1974 | Highberger ............................. 266/158 |

OTHER PUBLICATIONS

Survey of BOF hoods in North America, Millet L. Wei, Iron and Steel Engineer, Apr. 1998, pp. 25–30.

*Primary Examiner*—Scott Kastler
*Attorney, Agent, or Firm*—Harold I. Masteller, Jr.

[57] ABSTRACT

The invention is directed to water-cooled furnace hoods that exhaust gases away from a work area, and in particular, it is directed to an off-gas hood for use with a basic oxygen furnace (BOF). The furnace hood includes an assemblage of panels fastened together to form a flue positioned above a BOF at a location to receive gases generated by the furnace. Each panel includes an inlet header for receiving cooling water, an outlet header for discharging cooling water, and a plurality of tubes, such as a tube-bar-tube membrane, extending between the inlet and outlet headers to distribute cooling water between the headers. Jumper pipes extend between outlet headers and inlet headers located in adjacent panels. The jumper pipes distribute cooling between adjacent panels and thereby provide a continuous flow of cooling water along the length of the flue. The invention is also directed to a method of replacing the panels located in the assemblage of panels that make up the flue.

30 Claims, 10 Drawing Sheets

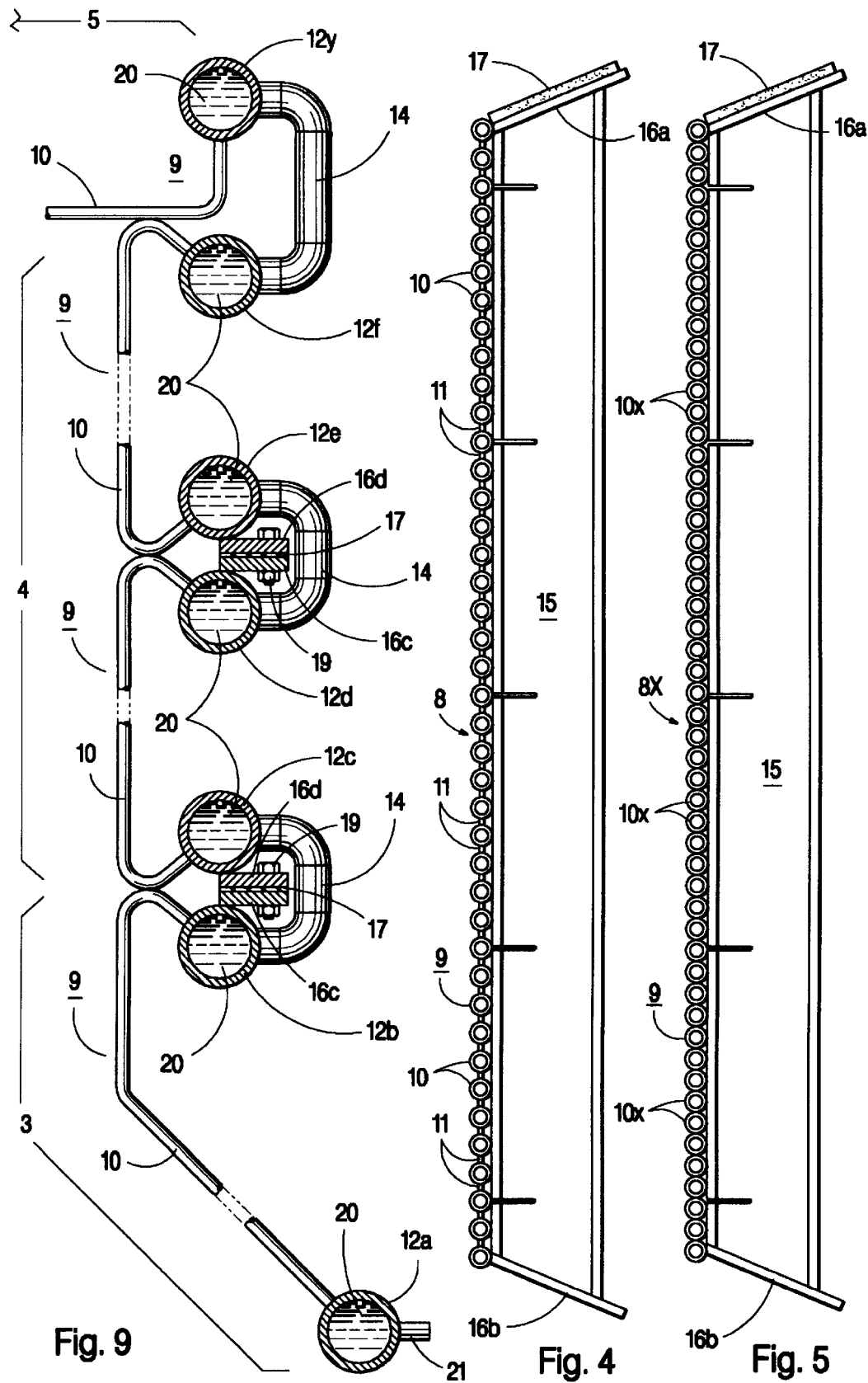

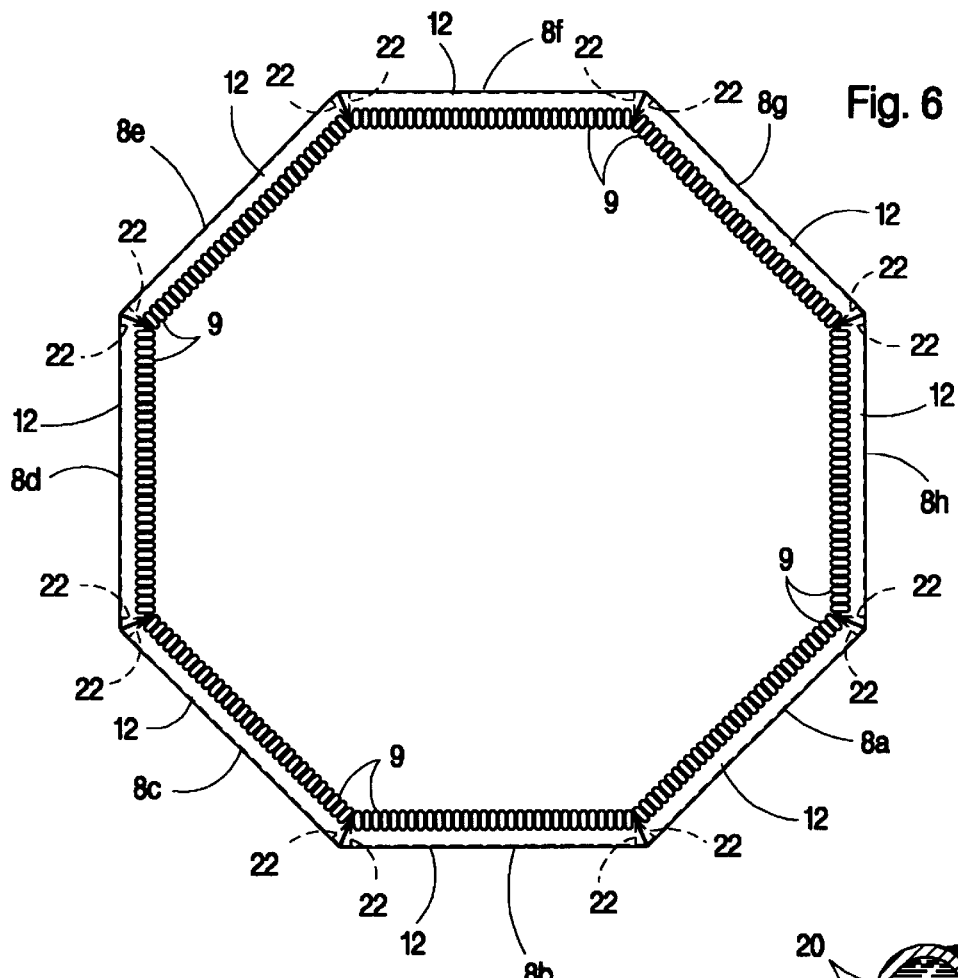
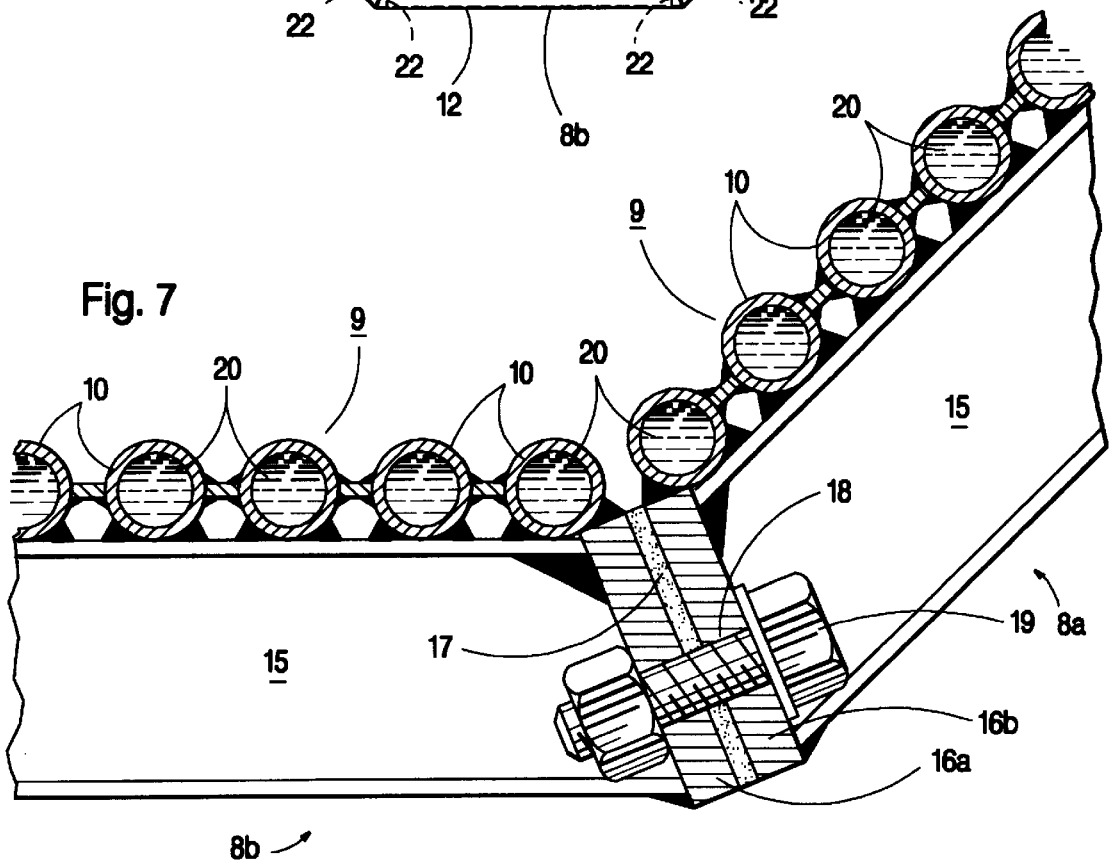

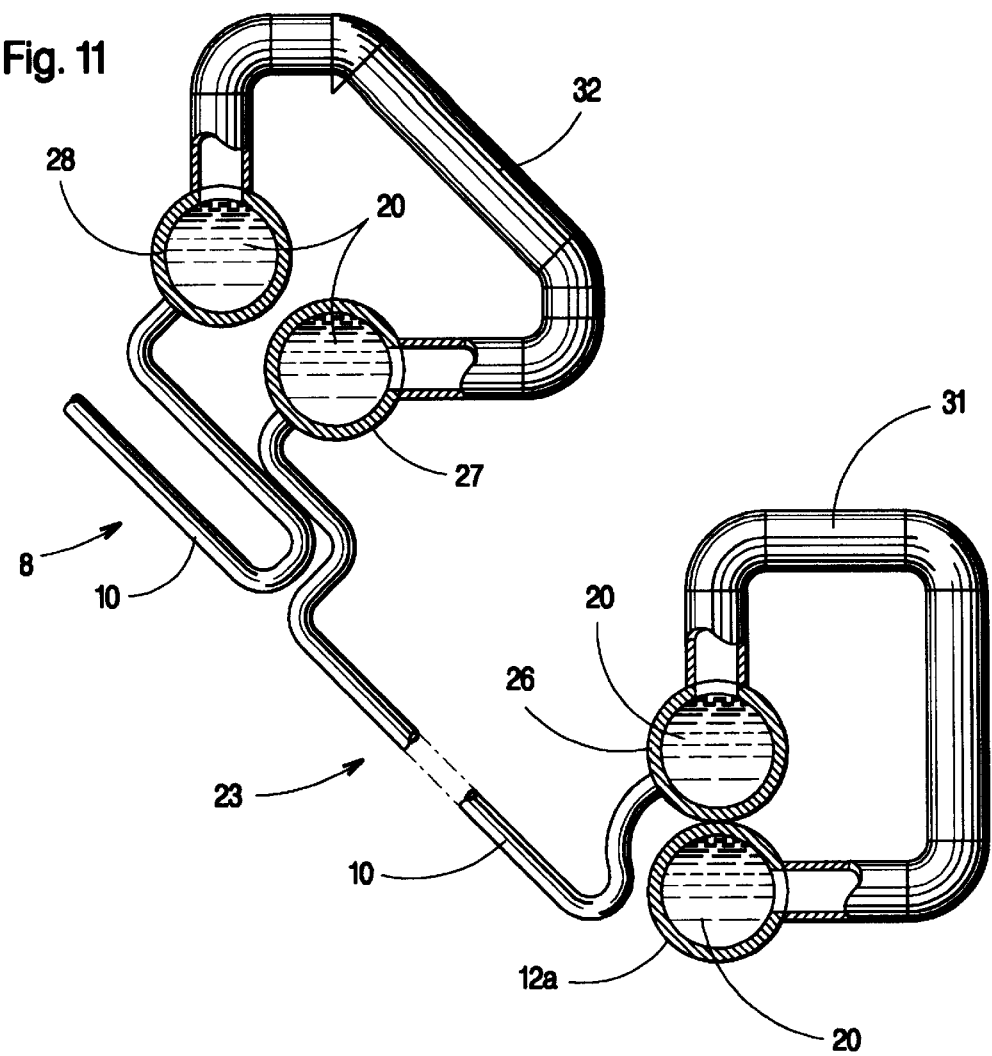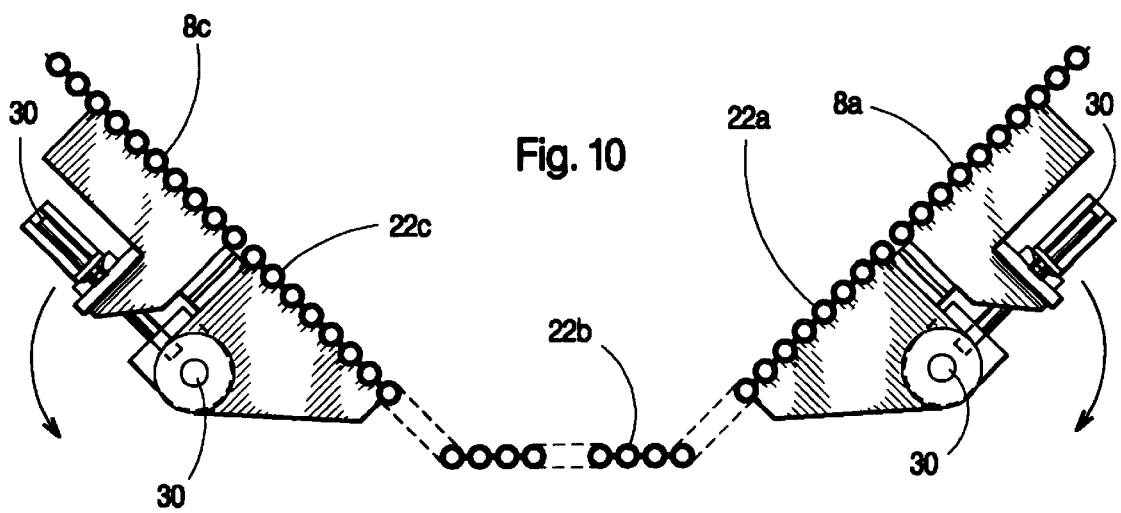

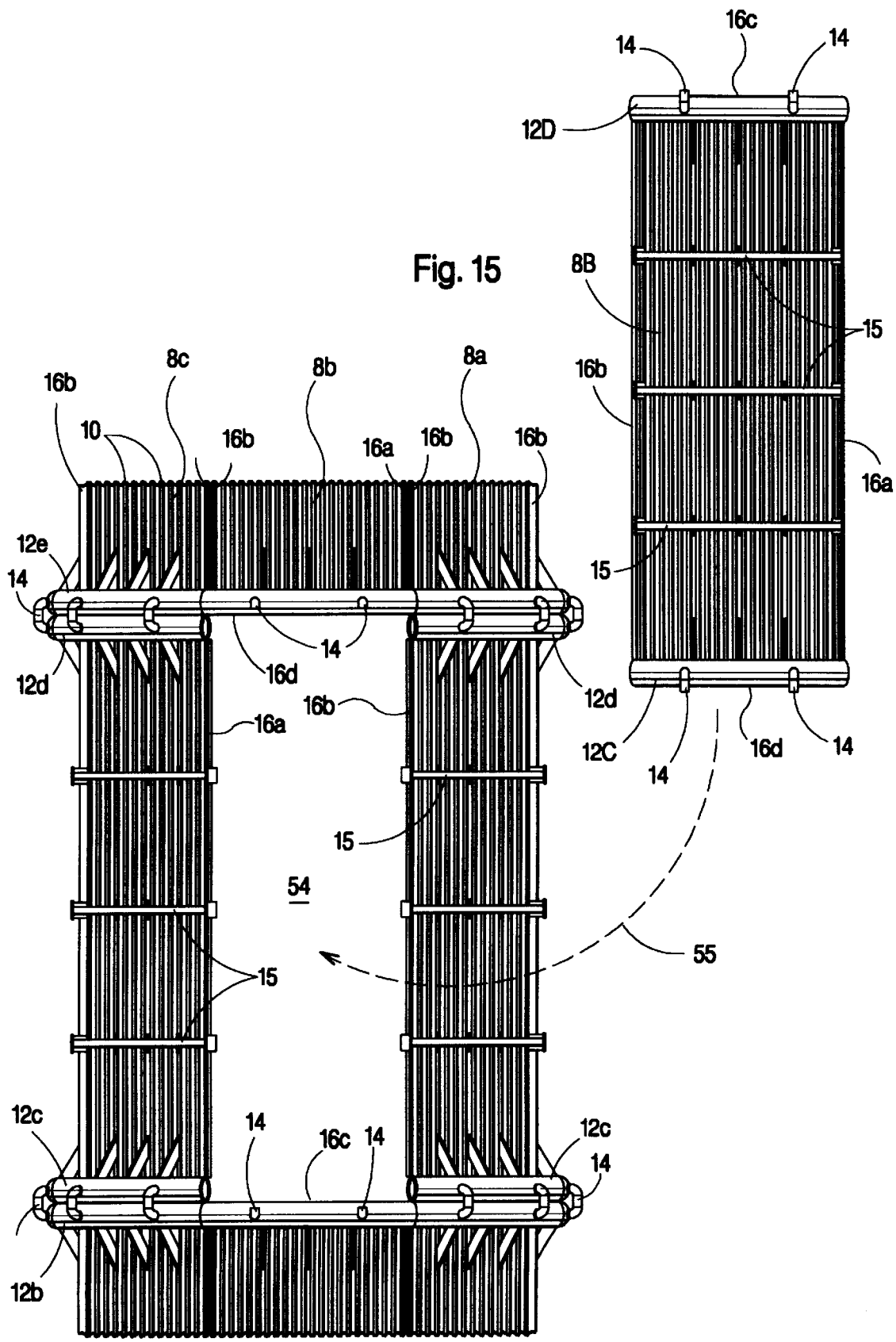

OFF-GAS HOOD FOR A BASIC OXYGEN FURNACE AND METHOD OF REPAIR

BACKGROUND OF THE INVENTION

This invention is related to apparatus for exhausting gas and fume produced during refining or smelting operations where vessels are used to reduce or purify ores or metals. It is also related to exhausting hazardous gases generated by industrial furnaces, and in particular, it is directed to a modular, tube type, off-gas hood for removing gas and fume from a basic oxygen furnace (BOF) in a steelmaking operation.

Improvements in BOF refractories and steelmaking methods such as slag splashing have extended BOF campaign life. However, campaign life is related to, and limited by, the durability of its off-gas hood system, Millet Wei, "*Survey of BOF hoods in North America*," Iron and Steel Engineering, Apr. 1998, pages 25–30. Off-gas hoods are a necessary part of any BOF steelmaking operation in order to insure that environmental regulations are met. When a BOF hood fails, the steelmaking operation must be shut down for hood repair to prevent the release of gas and fume into the atmosphere. In such instances, where a hood has limited durability, improvements in BOF refractories and steelmaking methods have no effect on the length of campaign life. The steelmaking operation must be shut down for hood repair regardless of the condition or maintenance schedule of the BOF steelmaking vessel. The failure rate for state-of-the-art BOF off-gas hoods ranges between 1–8 failures per year with an average 14-day shut down for each failure. Wei suggests that "Methods to reduce repair time should be explored with the goal of extending campaign life . . . . " Wei also discloses that, of the BOF steelmaking operations surveyed, 60% use tube-bar-tube (membrane) construction for their off-gas hoods, 24% of the shops use tube-to-tube construction, and 16% of the steelmakers use panel type hoods U.S. Pat. No. 3,593,974 granted to Ried).

Panel type off-gas hoods, as taught by Ried, are less expensive to manufacture than the above-two tube type hood designs (membrane and tube-to-tube). However, Wei teaches that such hood panels are associated with ". . . relatively lower water velocity higher thermal stresses and lower resistance to high pressure . . . " when compared to tube type off-gas hoods. Such conditions lead to more frequent hood failure and higher maintenance costs for panelized hoods. Additionally, panelized hoods consume a greater volume of water than the tube type hood designs.

Referring again to Wei, the membrane hood design consumes less cooling water than any other hood design known in the art, and it also generates a higher water velocity for a given water flow. Wei further teaches that tube-bar-tube hoods have an improved frequency of repair record when compared to other hood design, including the tube-to-tube designs. However, repair of any tube type hood, either membrane or tube-to-tube, is very labor intensive and time consuming. For example, in a tubular hood, the hood walls comprise long lengths of side-by-side tubing that are fastened together by welding along the lengths of the tubes. A typical hood structure comprises a conduit or flue having a geometric cross-section, for example, a circle, rectangle, trapezoid, etc. The hood flue is positioned above the mouth of a BOF vessel to collect and convey gas and fume away from the steelmaking operation. Such tubular off-gas hoods have more than 300 side-by-side welded tubes extending along the full length of the hood flue. In the event of a hood failure, due to cracking, erosion, burn through or the like, the damaged hood must be repaired to prevent gas and fume from escaping into the atmosphere, and to prevent water from flooding the steelmaking area. In the past, such off-gas hood repairs required operators to cut and splice each individual tube member extending through the damaged portion of the hood. There have been instances where as many as 80 tubes needed to be cut and splice welded to complete a single hood repair. Such extensive repair work will typically shut down steelmaking operations for about 14-days.

SUMMARY OF THE INVENTION

It is therefore an object of this invention to provide an improved panelized hood having improved water flow velocity.

It is a further object of this invention to provide a panelized hood having improved resistance to pressure and thermal stress.

It is a further object of this invention to provide an improved tube type hood that is easily repaired.

In satisfaction of the foregoing objects and advantages, the present invention provides a water cooled furnace hood that includes an assemblage of panels fastened together to form a flue for receiving gases generated by a furnace. Each panel includes an inlet header for receiving cooling water, an outlet header for discharging cooling water, and a plurality of tubes, such as a tube-bar-tube membrane, extending between the inlet and outlet headers to distribute cooling water there between. Jumper pipes extend between outlet headers and inlet headers located in adjacent panels. The jumper pipes distribute cooling between adjacent panels, and thereby provide a continuous flow of cooling water along the length of the flue.

BRIEF DESCRIPTION OF THE DRAWINGS

FIG. 4. is a transverse cross-section taken through a panel for constructing the off-gas hood.

FIG. 5. is a transverse cross-section similar to FIG. 4 showing an alternate panel embodiment for constructing the off-gas hood.

FIG. 6. is a transverse cross-section taken along the lines 6—6 of FIG. 2.

FIG. 7. is a cross-section taken through a longitudinal connection fastening adjacent panels.

FIG. 9. is a longitudinal cross-section through stacked panels.

FIG. 10. is a transverse cross-section taken through the removable door portion of the off-gas hood.

FIG. 11. is a longitudinal cross-section taken through the removable door portion of the off-gas hood.

FIG. 15. is an elevation view showing a replacement panel for the preferred embodiment of the present invention.

DETAILED DESCRIPTION OF THE PREFERRED EMBODIMENT

Figure 1:
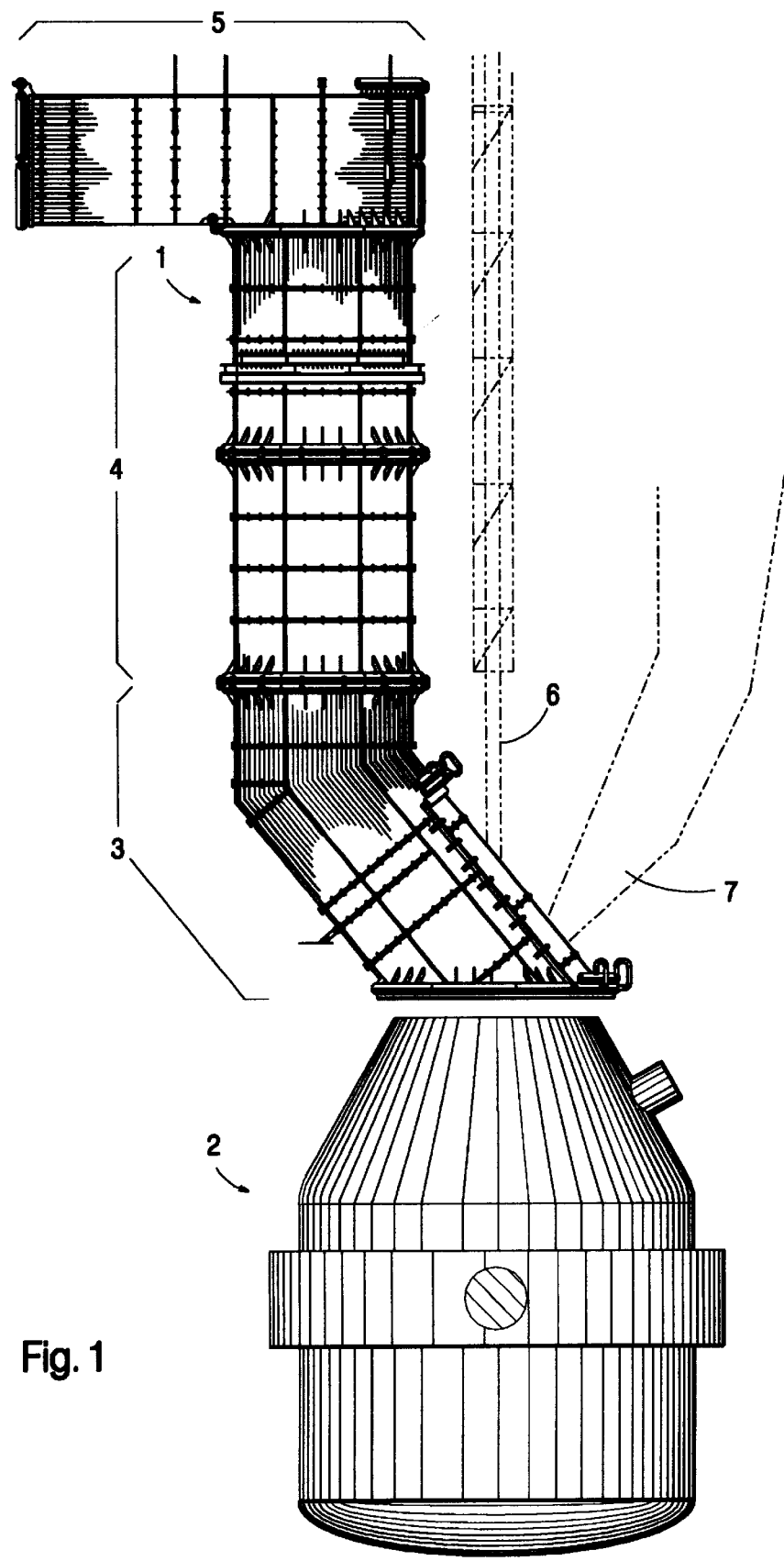
FIG. 1. is an elevation view of preferred embodiment showing an off-gas hood positioned above a basic oxygen furnace.

Referring to FIG. 1 of the drawings, a preferred off-gas hood 1 is shown positioned above the mouth of a basic oxygen furnace (BOF) 2. The off-gas hood includes an angled flue section 3, a vertical flue section 4, and a horizontal flue section 5. A lance 6 extends through an opening 24 (see FIG. 3) provided in the angled flue section 3 to inject gases into the molten metal bath contained in the BOF vessel, and a flux chute 7 also extends through an opening 36 (see FIG. 3) provided in flue section 3 to provide a means for charging steelmaking additives into the molten bath.

Figure 2:
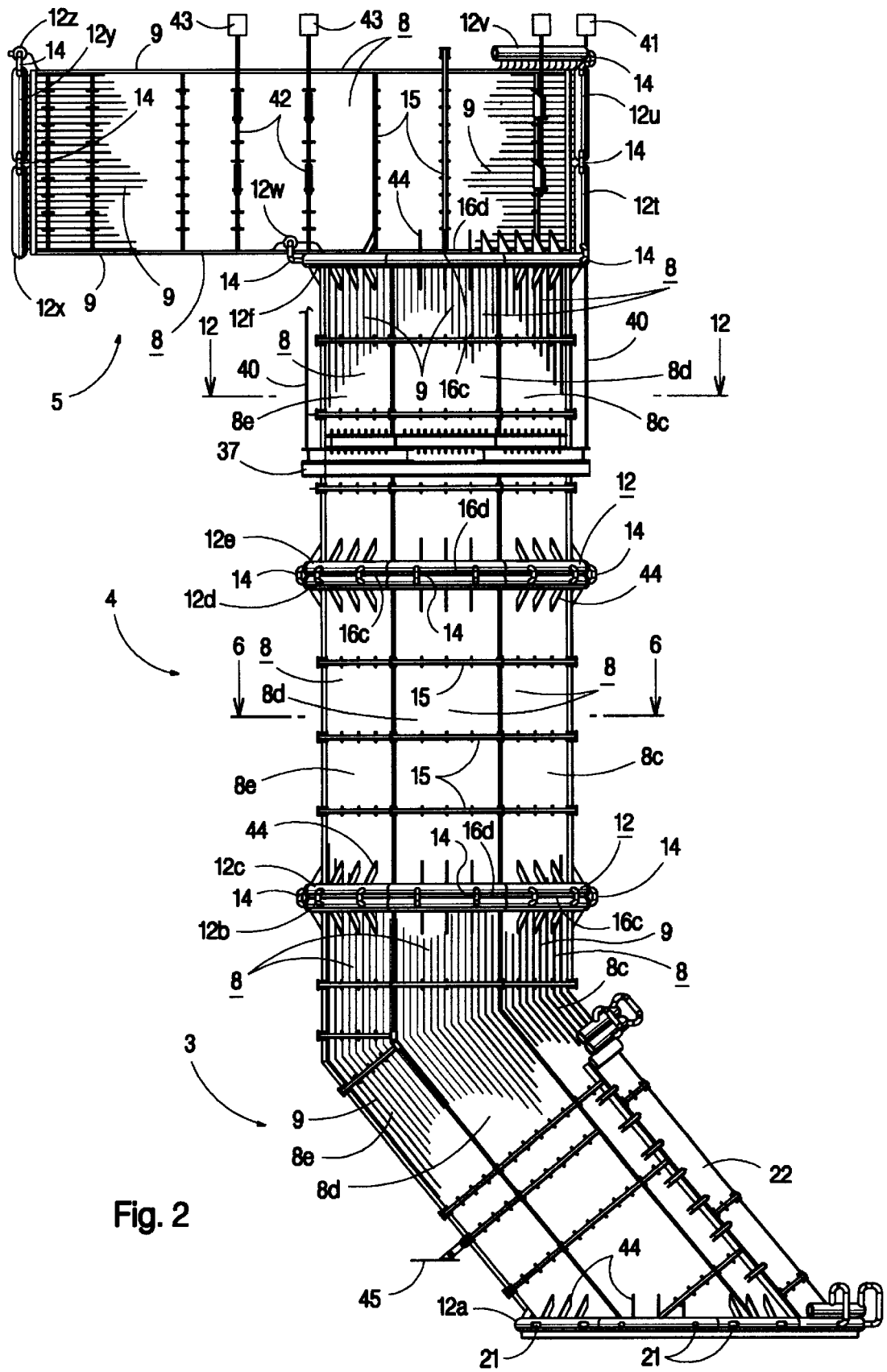
FIG. 2. is an enlarged view of the off-gas hood shown in FIG. 1.

Referring to the enlarged view of the off-gas hood shown in FIG. 2, each flue section 3, 4, and 5 is fabricated from a plurality of panels 8. Each panel 8 comprises a panel wall 9 that extends between headers 12 located at opposite ends of the panel. FIG. 4 shows a transverse cross-section taken through a preferred panel 8. In the preferred embodiment, panel 8 includes a wall 9 constructed from a plurality of alternating tubes 10 and bars 11. The bars extend between, and are welded along the length of, adjacent tubes 10 to form a tube-bar-tube membrane (the wall 9), that extends between the opposed headers 12 as shown in FIG. 2. However, it should be understood, that other construction arrangements can be used to fabricate a panel. For instance, FIG. 5 shows a section taken through an alternate panel embodiment 8X comprising tubes 10X welded directly to one another to form a tube-to-tube wall 9X extending between the opposed headers 12 shown in FIG. 2. Panels 8 and 8X further include stiffeners 15 that extend across the width of walls 9 and 9X to reinforce the membrane 10 and the tube-to-tube 10X walls as shown in FIGS. 4 and 5. Stiffeners 15 are located at spaced apart positions along the length of the panel (see FIG. 2), and angled connection plates are attached to opposite ends of stiffeners 15. The angled connection plates 16a and 16b extend between the opposed headers 12 of the panels 8 to provide means for fastening adjacent panels together.

Figure 3:
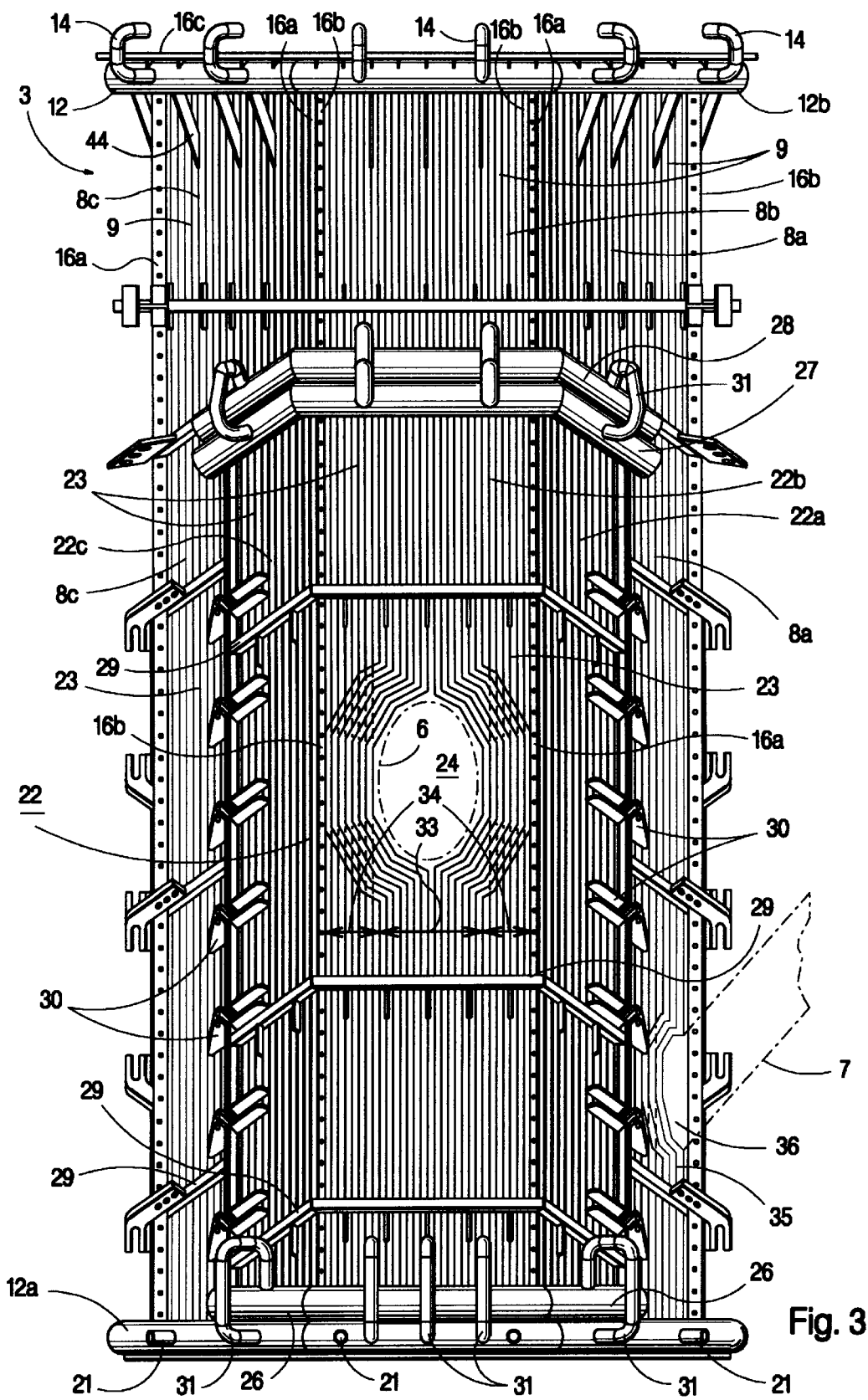
FIG. 3. is a view of a portion of the off-gas hood showing a removable door located in a portion of the off-gas hood.

As shown in FIG. 7, a cross-section taken through connection between panel 8a and panel 8b, connection plates 16a and 16b include apertures 18 that are aligned to receive fasteners 19 after seal 17 is inserted between the plates 16a and 16b. Fasteners 19 are inserted through apertures 18 and tightened to connect the adjacent panels along their length, and to squeeze seal 17 and provide a gas tight seal along the length of the connection. For example, referring to FIG. 3, an enlarged view of flue section 3, and also referring to FIG. 6, a cross-section taken along the lines 6—6 of FIG. 2, the geometric shape of the flue sections 3 and 4 in the preferred off-gas hood embodiment is octagonal. In FIG. 3, connection plates 16a and 16b are shown extending between headers 12a and 12b along the edges of the panels 8h–8h that make up the flue in the off-gas hood. In other words, each panel 8a–8h includes its own pair of headers 12a and 12b attached to opposite ends of the membrane 9, and its own pair of connector plates 16a and 16b. FIG. 6 shows flue sections 3 and 4 including at least one set of panels 8a–8h that are connected together to form a closed flue or conduit. For example, looking at FIG. 2, flue section 3 comprising a single set of panels 8a–8h with each panel having a header 12a and 12b attached to opposite ends of the membrane 9, while flue section 4 includes a pair of stacked panel sets 8a–8h linked together at their adjacent headers 12d and 12e. It should be understood, however, that an off-gas hood can comprise any cross-sectional shape, and any number of stacked panel sets, without departing from the scope of this invention. For instance, the flue can be circular, square, rectangular, triangular trapezoidal, etc. Additionally a flue section can have more than two stacked panel sets along the length of the hood.

Figure 8:
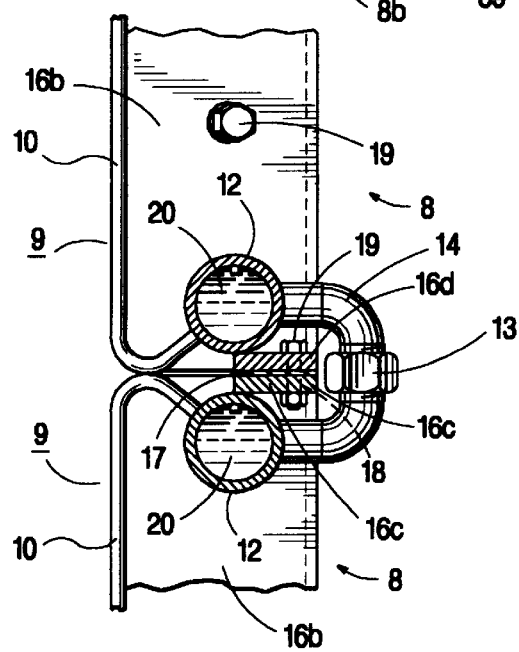
FIG. 8. is a cross-section taken through a transverse connection fastening adjacent panels.

Referring to FIGS. 3 and 8, the panels 8 further include connection plates 16c and 16d attached to headers 12. Plates 16c and 16d include apertures 18 for receiving fasteners 19 that link together the adjacent headers 12 of stacked panels. A gasket 17, inserted between connection plates 16c and 16d to provide a gas tight seal between the connector plates 16c and 16d when the fasteners are tightened. When assembled, the connection plates 16a–16d provide a gas tight seal along at least three sides of each panel of the off-gas. Jumper pipes 14, shown in FIGS. 2, 8, and 9, extend between the adjacent headers 12 to provide a continuous flow of cooling water 20 from the inlet header 12a located in flue section 3 to the outlet header 12z in flue section 5 (see FIG. 2).

Referring again to FIGS. 2 and 9, an exemplary cooling water flow begins at the inlet header 12a where an inflow of cooling water is received from a water source (not shown) via inlet pipes 21. Referring for a moment to FIG. 6, each header 12 includes a pair of internal baffles 22 located at the ends of the header. The baffles close off the header ends and forces the flow of cooling water to follow an upward stream along a single column of linked headers, for example headers 12a–12f in the column of stacked panel sections 8a. The headers distribute the incoming cooling water 20 into the tubes 10, and pressure from the water source forces the water upward and into the linking headers 12b attached to the membrane 9 opposite header 12a. One or more jumper pipes 14 extend from each linking header 12b. Pipe 14 communicates with a linking header 12c attached to a membrane 9 in the next stacked panel set 8a–8h located along flue section 4, and flue section 4 includes a plurality of stacked panel sets 8a–8h along the length of the flue. In the preferred embodiment, flue section 4 includes an arrangement of two stacked panel sets 8a–8h beginning at header 12c and ending at header 12f, header 12f being connected to the top chamber shown as section 5. Each of the headers 12c through 12f includes at least one jumper pipe that extends between adjacent headers in the stacked panel set arrangement. To illustrate, headers 12c receives an incoming flow of cooling water from flue section 3, and the header distributes the water into its respective membrane tubes 10 that make up the walls 9 in the first panel set 8a–8h. The cooling water flows into header 12d at the opposite end of the membrane and "jumps the gap" between the stacked panel sets via the jumper pipes 14. The water flows into header 12e where it is again distributed into membrane tubes 10 in the second, or last, stacked panel set 8a–8h of flue section 4. Header 12f is fastened by connection plate 16c to the top chamber 5, FIG. 2, and jumper pipes 14 connect header 12f to headers 12t through 12w to distribute the cooling water into various membranes that make up the wall portions of the top chamber. The top chamber membranes 9 extend from headers 12t–12w to an arrangement of outlet headers 12x–12z where the cooling water is discharged from the off-gas hood cooling system for treatment and/or recycling.

The jumper pipes 14, extending between adjacent headers, can be connected by welding, FIG. 9, or coupled together using any suitable pipe coupling 13 well known in the art, to facilitate disconnecting the jumper pipes 14 from the headers when repair is required.

Referring once again to FIGS. 2 and 3, the first flue section 3 includes a removable cover or door 22 located in the angled portion directly above the BOF vessel to provide workers access into the vessel for relining and other required maintenance operations. Door 22 includes membrane walls 23 attached to headers 26 and headers 27, stiffeners 29 that are spaced apart along the length of the door assembly between headers 26 and 27, and releasable latches 30 spaced along the door edges to removeably attach door 22 to flue section 3. By way of illustration, and referring to FIGS. 3 and 10, door 22 includes panel 22a removeably attached by latches 30 to panel 8a of flue section 3, and panel 22c removeably attached by latches 30 to panel 8c of flue section 3. A panel 22b extends along the lengths of panels 22a and 22c between the opposed headers 26 and 27, and is attached to panels 22a and 22c by connection plates 16a and 16b as heretofore described. As shown more clearly in FIG. 11, headers 26 receive an inflow of cooling water 20 from inlet header 12a through jumper pipes 31 extending between the headers. Headers 26 distribute the cooling water into the various membrane tubes 23 where the cooling water flows into each respective header 27. The cooling water 20 exits headers 27 through jumper pipes 32 and enters the headers 28 attached to membranes 9 in panels 8a–8b of flue section 3 where it is distributed into the various tubes of the respective membranes and into the linking headers 12b.

A selected number of membrane tubes 33 in the door assembly 22 are formed into a bowed configuration to provide opening 24 for receiving the gas lance 6. The modified tubes 33 are arranged in an overlapping tube configuration that allows tubes 33 to pass either directly above or directly below the remaining, unmodified tubes 34 in the door. In like manner, flue section 3 also includes an overlapping tube arrangement 35 to provide opening 36 to receive the flux chute 7.

Figure 12:
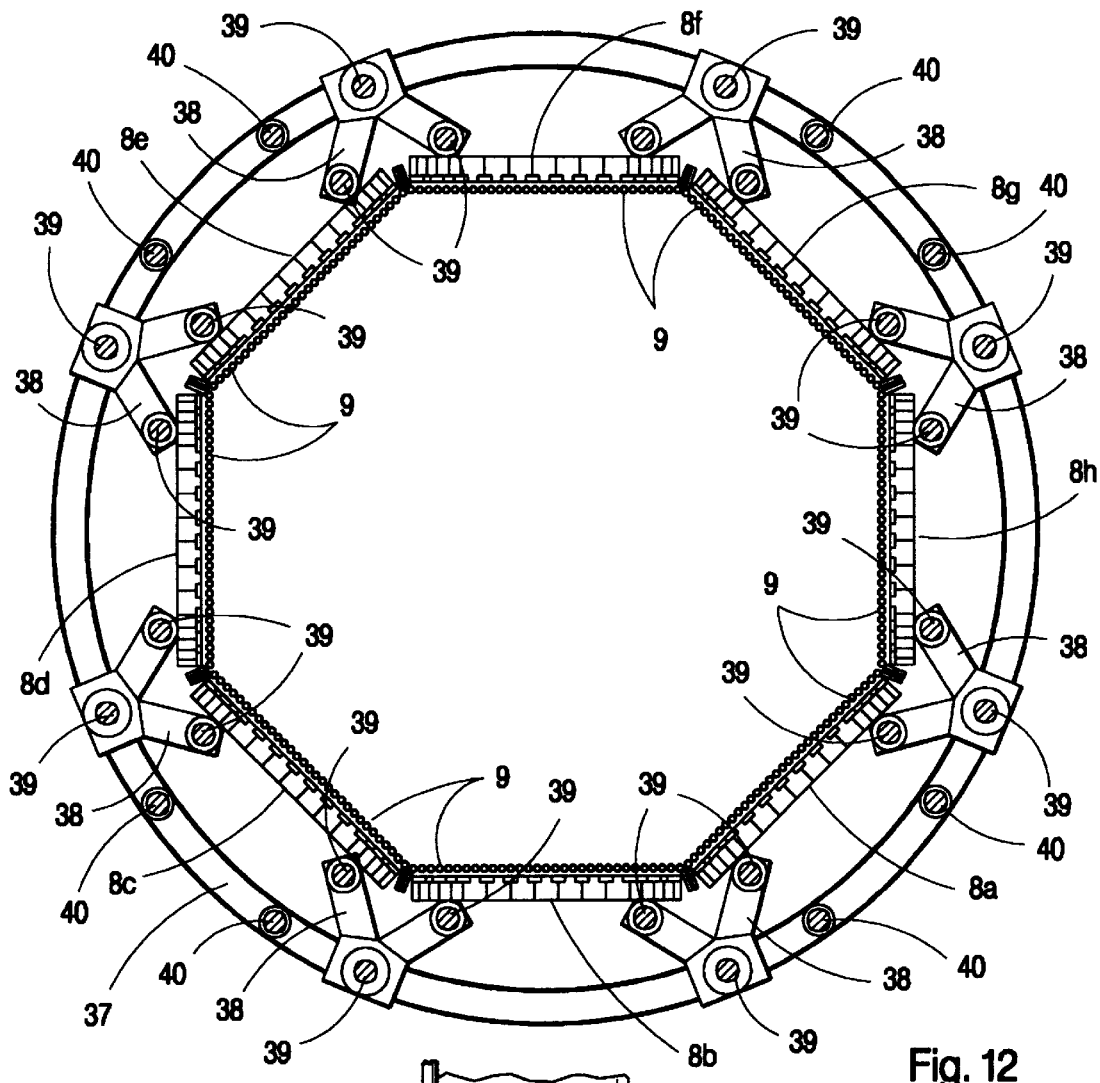
FIG. 12. is a transverse cross-section taken along the lines 12—12 of FIG. 2.

Referring to FIGS. 2 and 12, a structural framework is provided to support the off-gas hood 1 in position above the basic oxygen furnace 2. The framework includes a yoke assembly 37 attached to the off-gas hood by brackets 38 and fasteners 39. Yoke 37 is suspended from hangers 40 attached to a spring mechanism 41 (FIG. 2) that absorb forces generated during steelmaking operations, for example thermal stress brought about by expansion and contraction of the hood. In similar fashion, exhaust flue section 5 is also supported by hangers 42 attached to springs 43 that absorb thermal shock forces in the off-gas hood structure. Various stiffener arrangements 44 and bracing arrangements 45 are also used to support the hood structure and provide additional rigidity.

Figure 13:
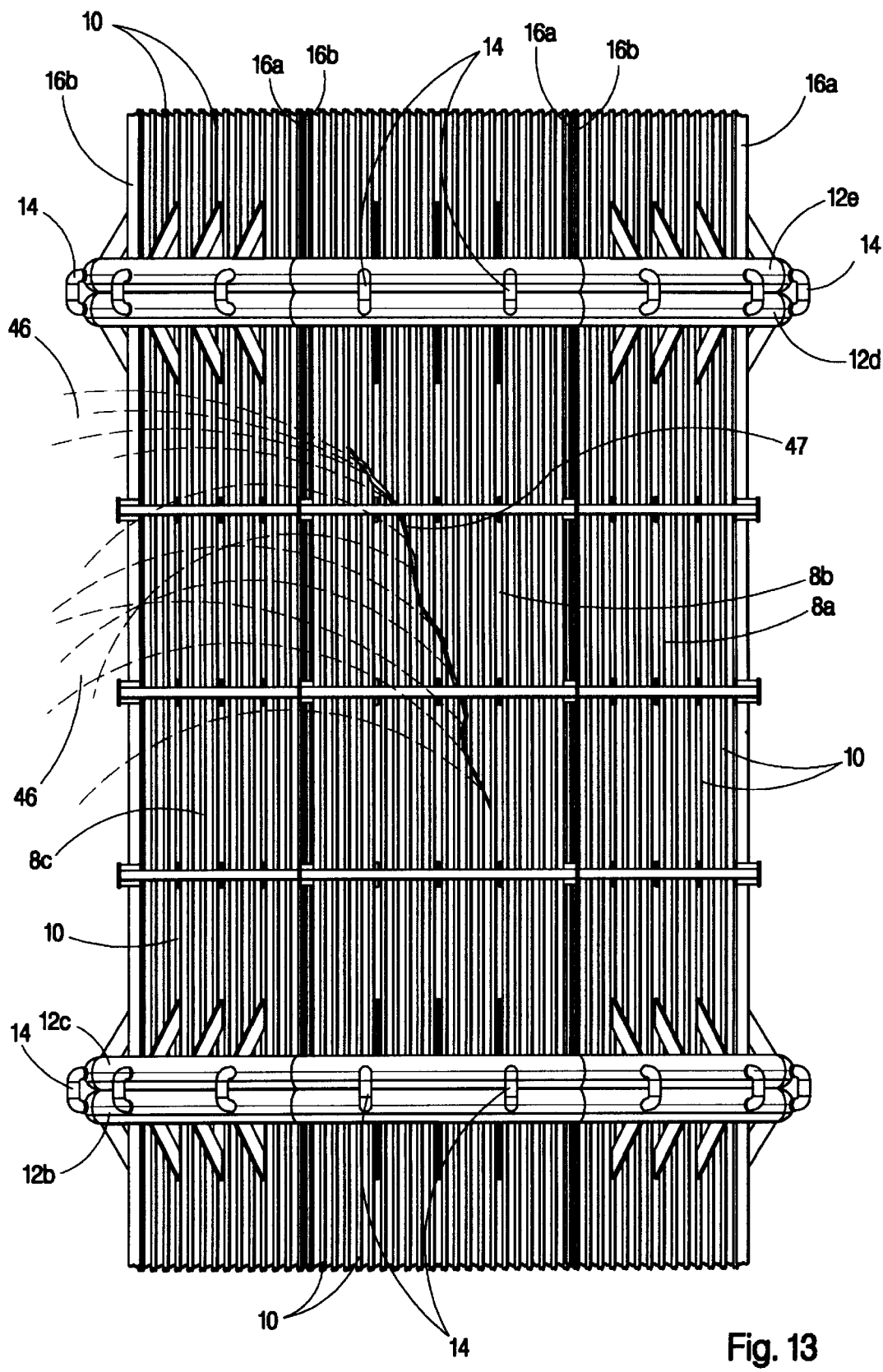
FIG. 13. is an elevation view of the preferred embodiment showing a damaged hood section.
Figure 14:
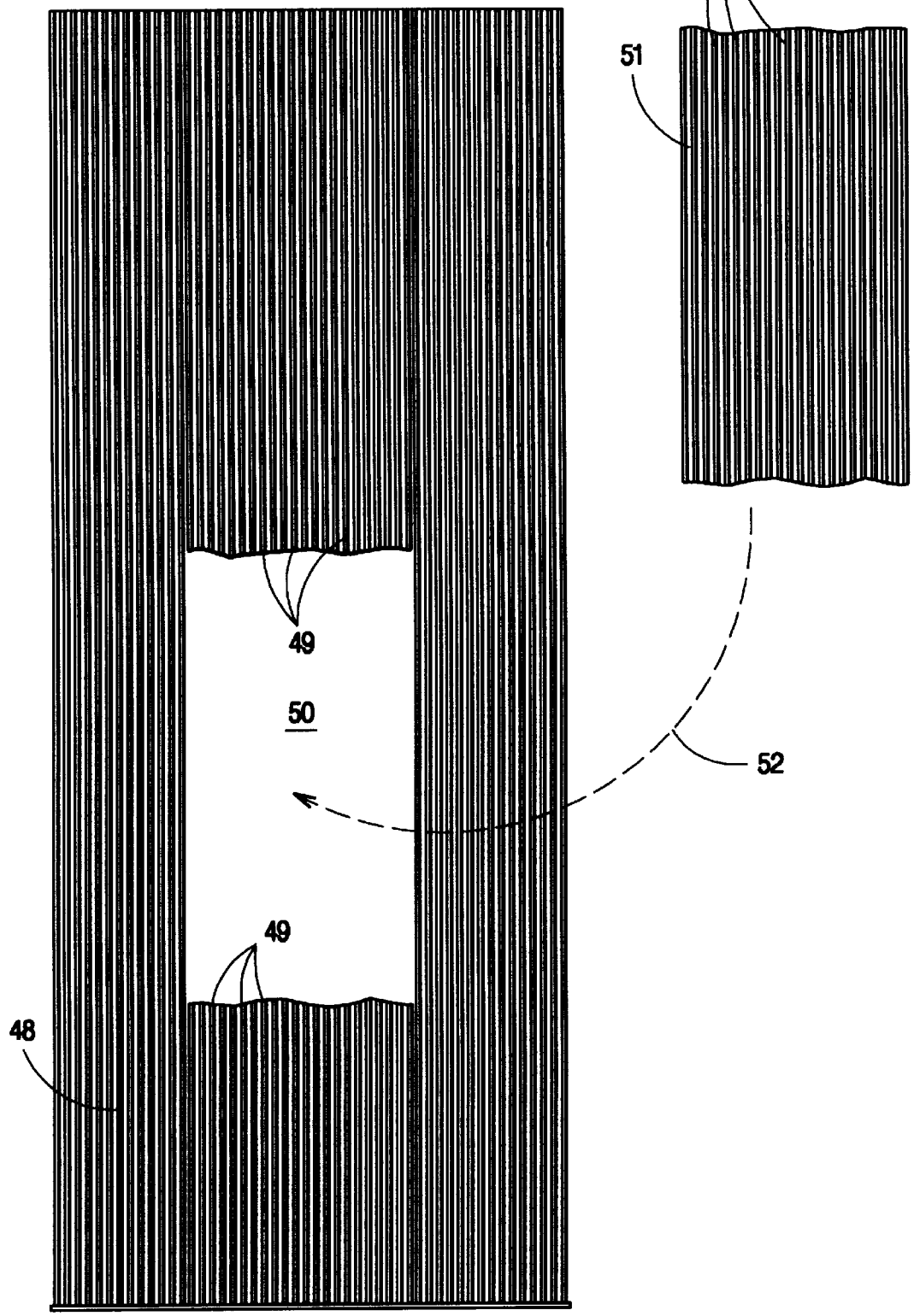
FIG. 14. is an elevation view showing a replacement panel for a prior art off-gas hood.

The combined panel, header, and jumper pipe arrangement, simplifies initial hood manufacture as well as hood repair during its service life. To illustrate, FIG. 13 shows a portion of the present off-gas hood invention. One of the panels 8b is shown having a blow out where cooling water and/or fume 46 erupts from the damaged portion 47 of the panel. Such damage is procured by various events including burn through from intense steelmaking temperatures, structural failure caused by thermal stresses, inadequate cooling at localized areas due to plugged or blocked membrane tubes, and other similar like conditions. In such instances, the water supply is shut down and the off-gas hood and the BOF vessel are allowed to cool down to a suitable working temperature for making repairs. In a state-of-the-art off-gas hood, as shown in FIG. 14 (labeled Prior Art), a damaged membrane portion is repaired by flame cutting through each tube 49 extending along the damaged area and the cut section is removed from the hood to provide an opening 50 for receiving a new, replacement membrane section 51. The cut tubes 49 and edges extending along the opening 50 are trimmed and cleaned to place the damaged section in condition for receiving a new membrane section 51, and the new membrane section 51 is manufactured as close as possible to the size and shape of opening 50. The final hood repair is accomplished by inserting the new membrane section into opening 50, as shown by arrow 52, and welding both ends of each tube 53 to corresponding cut ends of the tubes 49 extending along edges of opening 50. The perimeter of the "patch" 51 is welded to insure a gas tight connection. Such repair operations are very time consuming and average about 14 days of downtime for each hood repair.

In the case of the instant invention, when repair temperature is reached, millwrights cut or disconnect the jumper pipes 14 extending from headers 12c and 12d as shown in FIG. 15. Fasteners 19 (FIG. 8) are removed from the connector plates 16a through 16d, and the damaged panel 8b is removed from the off-gas hood to provide an opening 54 for receiving a new panel 8B. The new panel 8B is inserted into position as shown by arrow 55, and fasteners are inserted through apertures 18 that extend through the four connection plates 16a–16d to fix the new panel 8B in place. As heretofore described, gaskets are provided at connection plates 16a–16d to provide a watertight connection. Finally, new jumper pipes 14 are connected between adjacent headers 12b and 12e and the new headers 12c and 12d. The improved hood repair process consumes about 2 days of down time for each hood repair, about a 65% improvement over past repair procedures.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

We claim:

1. A furnace hood device for exhausting furnace gas from a work area, said furnace hood device comprising:
   a) at least two panels fastened together to provide a flue positioned at a location to receive gases generated by a furnace, each of said at least two panels comprising:
      i) an inlet header for receiving cooling water;
      ii) an outlet header;
      iii) a plurality of tubes attached to and distributing the cooling water from said inlet header to said outlet header, said tubes being arranged adjacent to one another to define an inside surface exposed to said gases and an outside surface opposite to said inside surface, wherein said inlet header and said outlet header are offset back from said inside surface such that said inlet header and said outlet header remain substantially apart from said gases, said tubes having turns at opposite ends of the inside surface, each turn being toward a respective one of said inlet header and outlet header, to accommodate said offset; and
      iv) at least one jumper pipe forming a fluid connection between an outlet header in a first panel and an inlet header in a second panel of said at least two panels, said jumper pipe providing means for distributing cooling water between the panels.

2. The furnace hood device recited in claim 1 wherein said plurality of tubes comprises:
   a) a tube-to-tube arrangement forming a fluid connection between said inlet header and said outlet header.

3. The furnace hood device recited in claim 1 wherein said plurality of tubes comprises:
   b) a tube-bar-tube membrane forming a fluid connection between said inlet header and said outlet header.

4. The furnace hood device recited in claim 1 comprising:
   a) a first flue section positioned at said location to receive gases generated by the furnace, said first flue section including at least two said panels having at least one inlet header attached to a water supply; and
   b) a second flue section having one end attached to said first flue section and a second end attached to a top chamber, said furnace hood device including at least two said panels.

5. The furnace hood device recited in claim 4 comprising:
   a) at least one jumper pipe forming a fluid connection between at least one of the outlet header located in said first flue section and at least one inlet header located in said second flue section.

6. The furnace hood device recited in claim 4 comprising:
   a) at least one jumper pipe forming a fluid connection between at least one outlet header located in said second flue section and at least one inlet header located in said top chamber.

7. The furnace hood device recited in claim 4 comprising:
   a) at least one jumper pipe forming a fluid connection between at least one of the outlet headers located in said first flue section and at least one inlet header located in said second flue section; and
   b) at least one jumper pipe forming a fluid connection between at least one outlet header located in said second flue section and at least one inlet header located in said top chamber.

8. The furnace hood device recited in claim 4 wherein said second flue section includes a plurality of stacked panel sets, each said stacked panel set providing a length of flue along said second flue section.

9. The furnace hood device recited in claim 8 comprising:
   a) a first stacked panel set having at least one inlet header attached to at least one outlet header of said first flue section, and at least one outlet header having a jumper pipe communicating with at least one inlet header of a next stacked panel set; and
   b) a last stacked panel set having at least one inlet header attached to at least one outlet header of a stacked panel set, and at least one outlet header having a jumper pipe communicating with at least one inlet header in said top chamber.

10. The furnace hood device recited in claim 4 wherein said plurality of tubes comprises:
    a) a tube-to-tube arrangement forming a fluid connection between said inlet header and said outlet header.

11. The furnace hood device recited in claim 4 wherein said plurality of tubes comprises:
    a) a tube-bar-tube membrane forming a fluid connection between said inlet header and said outlet header.

12. The furnace hood device recited in claim 4 wherein said flue is positioned at a location to receive fume and gases generated by a refining vessel.

13. The furnace hood device recited in claim 4 wherein said flue is positioned at a location to receive fume and gases generated by a basic oxygen furnace.

14. A panel for constructing a furnace hood comprising:
    a) an inlet header for receiving cooling water;
    b) an outlet header spaced apart from said inlet header;
    c) a plurality of tubes communicating with said inlet header and said outlet header, said tubes being arranged adjacent to one another to define an inside surface that is exposable to furnace gases and an outside surface opposite to said inside surface, wherein said inlet header and said outlet header are offset back from said inside surface such that said inlet header and said outlet header remain substantially apart from said gases, said tubes having turns at opposite ends of the inside surface, each turn being toward a respective one of said inlet header and outlet header, to accommodate said offset; and
    d) at least one jumper pipe extending outward from said outlet header discharging cooling water from said outlet header.

15. The panel recited in claim 14 comprising:
    a) connector plates extending along said panel, away from said inside surface.

16. The panel recited in claim 15 including a gasket attached to at least one of said connector plates extending along said panel.

17. The panel recited in claim 14 wherein said plurality of tubes comprises:
    a) a tube-to-tube arrangement of parallel tubes forming a fluid connection between said inlet header and said outlet header.

18. The panel recited in claim 14 wherein said plurality of tubes comprises:
    a) a tube-bar-tube membrane forming a fluid connection between said inlet header and said outlet header.

19. A furnace hood comprising:
    a) an assemblage of panels fastened together to form a flue for receiving gases generated by a furnace, each panel including:
       i) an inlet header for receiving cooling water;
       ii) an outlet header for discharging cooling water;
       iii) a plurality of tubes forming a fluid connection between said inlet header and said outlet header to distribute cooling water there between, said tubes being arranged adjacent to one another to define an inside surface exposed to said gases and an outside surface opposite to said inside surface, wherein said inlet header and said outlet header are offset back from said inside surface such that said inlet header and said outlet header remain substantially apart from said gases, said tubes having turns at opposite ends of the inside surface, each turn being toward a respective one of said inlet header and outlet header, to accommodate said offset; and
       iv) jumper pipes forming a fluid connection between outlet headers and inlet headers located in adjacent panels, the jumper pipes distributing cooling water between said adjacent panels and thereby providing a continuous flow of cooling water along a length of the flue.

20. The furnace hood device recited in claim 1, wherein said at least two panels are fastened together using connector plates that extend away from said gases and away from said inside surface.

21. The furnace hood device recited in claim 20, wherein at least one of said connector plates is offset back from said inside and outside surfaces.

22. The furnace hood device recited in claim 20, further comprising a gasket sandwiched between fastened ones of said connector plates.

23. The furnace hood device recited in claim 1, wherein each of said turns is such that ends of said tubes extend at an acute angle with respect to said outside surface.

24. The panel recited in claim 15, wherein said connector plates extend along said panel, and in a direction away from said inside surface.

25. The panel recited in claim 24, wherein at least one of said connector plates is offset back from said inside and outside surfaces.

26. The panel recited in claim 24, further comprising a gasket located against a major surface of each of said connector plates.

27. The panel recited in claim 15, wherein each of said turns is such that ends of said tubes extend at an acute angle with respect to said outside surface.

28. A furnace hood device for exhausting furnace gas from a work area, said furnace hood device comprising:
- a) at least two panels fastened together to provide a flue positioned at a location to receive gases generated by a furnace, each of said at least two panels comprising:
  - i) an inlet header for receiving cooling water;
  - ii) an outlet header;
  - iii) a plurality of tubes attached to and distributing the cooling water from said inlet header to said outlet header, said tubes being arranged adjacent to one another to define an inside surface exposed to said gases and an outside surface opposite to said inside surface;
  - iv) at least one jumper pipe forming a fluid connection between an outlet header in a first panel and an inlet header in a second panel of said at least two panels, said jumper pipe providing means for distributing cooling water between the panels; and
  - v) connector plates extending along each panel, and offset back from the inside and outside surfaces, said panels being fastened to one another using said collector plates, said tubes having turns at opposite ends of the inside surface, each turn being toward a respective one of said collector plates.

29. A panel for constructing a furnace hood comprising:
i) an inlet header for receiving cooling water;
ii) an outlet header;
iii) a plurality of tubes attached to and distributing the cooling water from said inlet header to said outlet header, said tubes being arranged adjacent to one another to define an inside surface that can be exposed to furnace gases and an outside surface opposite to said inside surface;
iv) at least one jumper pipe forming a fluid connection between an outlet header in a first panel and an inlet header in a second panel of said at least two panels, said jumper pipe providing means for distributing cooling water between the panels; and
v) connector plates extending along each panel, and offset back from the inside and outside surfaces, said tubes having turns at opposite ends of the inside surface, each turn being toward a respective one of said collector plates.

30. A furnace hood comprising:
a) an assemblage of panels fastened together to form a flue for receiving gases generated by a furnace, each panel including:
  i) an inlet header for receiving cooling water;
  ii) an outlet header;
  iii) a plurality of tubes attached to and distributing the cooling water from said inlet header to said outlet header, said tubes being arranged adjacent to one another to define an inside surface exposed to said gases and an outside surface opposite to said inside surface;
  iv) at least one jumper pipe forming a fluid connection between an outlet header in a first panel and an inlet header in a second panel of said at least two panels, said jumper pipe providing means for distributing cooling water between the panels; and
  v) connector plates extending along each panel, and offset back from the inside and outside surfaces, said panels being fastened to one another using said collector plates, said tubes having turns at opposite ends of the inside surface, each turn being toward a respective one of said collector plates.

* * * * *